June 16, 1964        T. H. KENNY ETAL        3,137,155
DIGITAL READOUT COMBINATION LOCK CONSTRUCTION
Filed May 11, 1961                           6 Sheets-Sheet 1
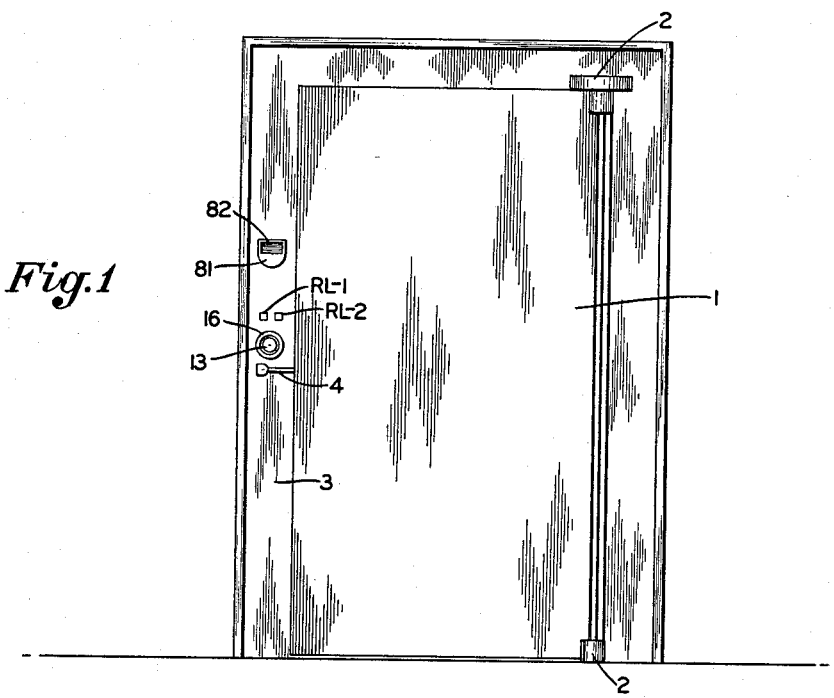
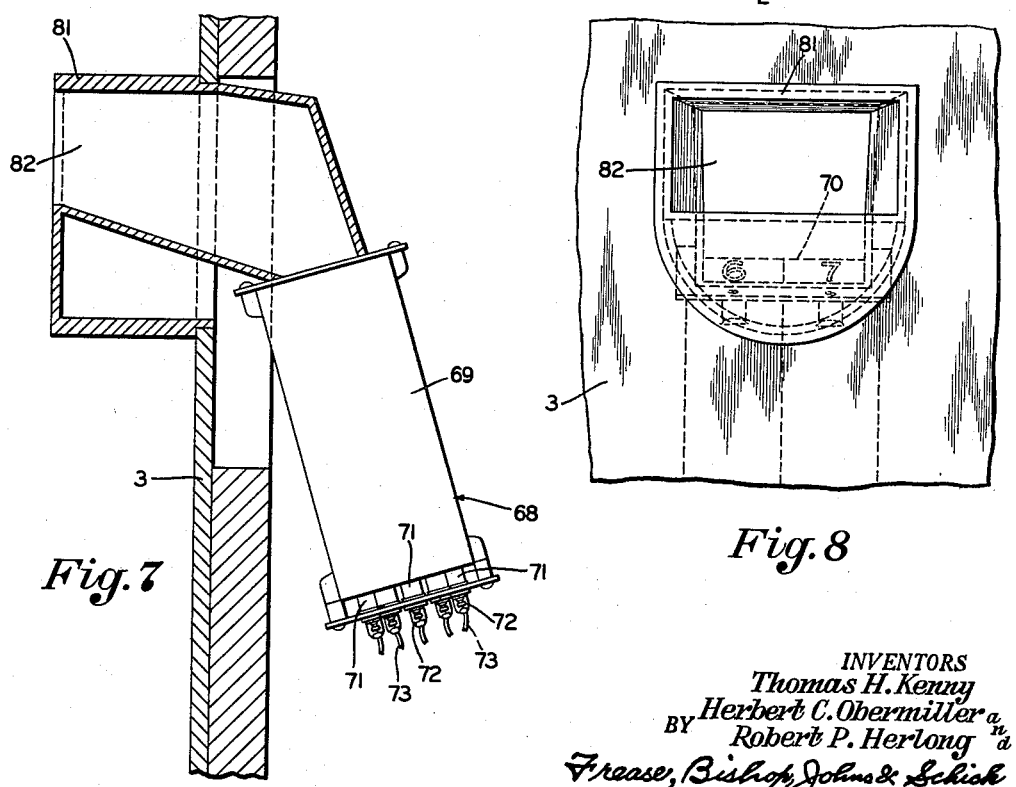
INVENTORS
Thomas H. Kenny
Herbert C. Obermiller and
BY Robert P. Herlong
Frease, Bishop, Johns & Schick
ATTORNEYS

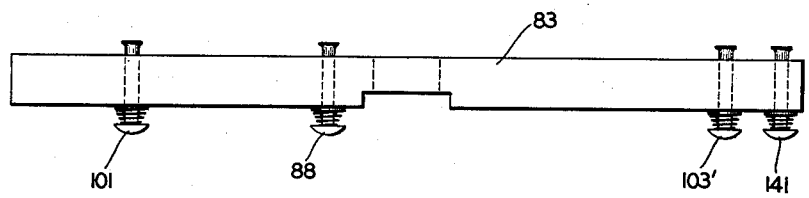
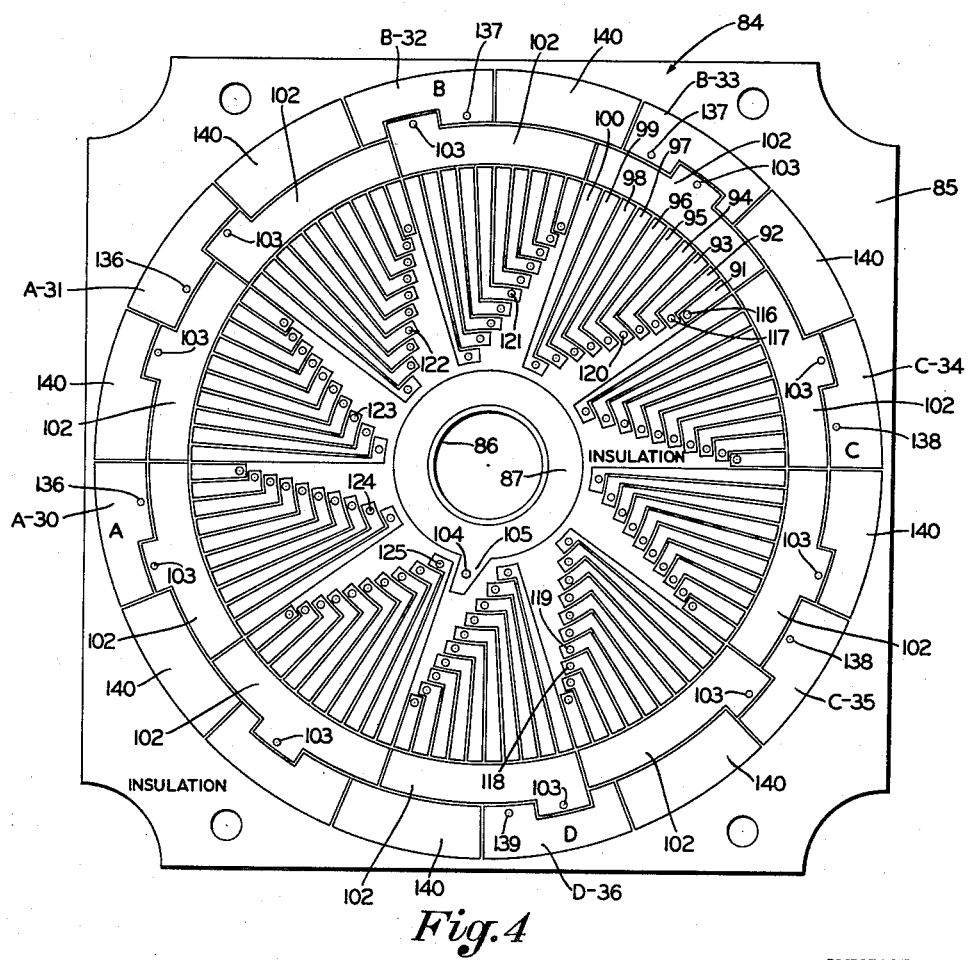

June 16, 1964 T. H. KENNY ETAL 3,137,155
DIGITAL READOUT COMBINATION LOCK CONSTRUCTION
Filed May 11, 1961 6 Sheets-Sheet 4

INVENTORS
Thomas H. Kenny
Herbert C. Obermiller and
BY Robert P. Herlong

Frease, Bishop, Johns & Schick
ATTORNEYS

June 16, 1964    T. H. KENNY ETAL    3,137,155
DIGITAL READOUT COMBINATION LOCK CONSTRUCTION
Filed May 11, 1961    6 Sheets-Sheet 6
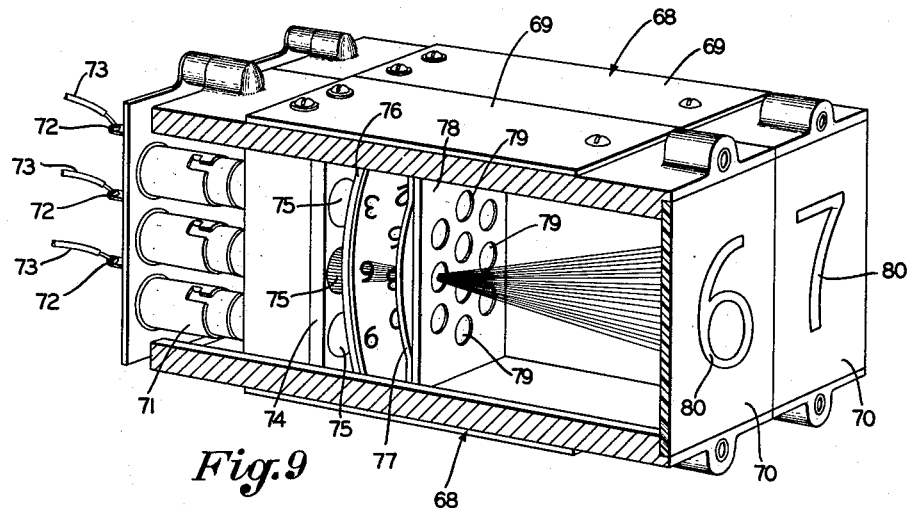
*Fig.9*
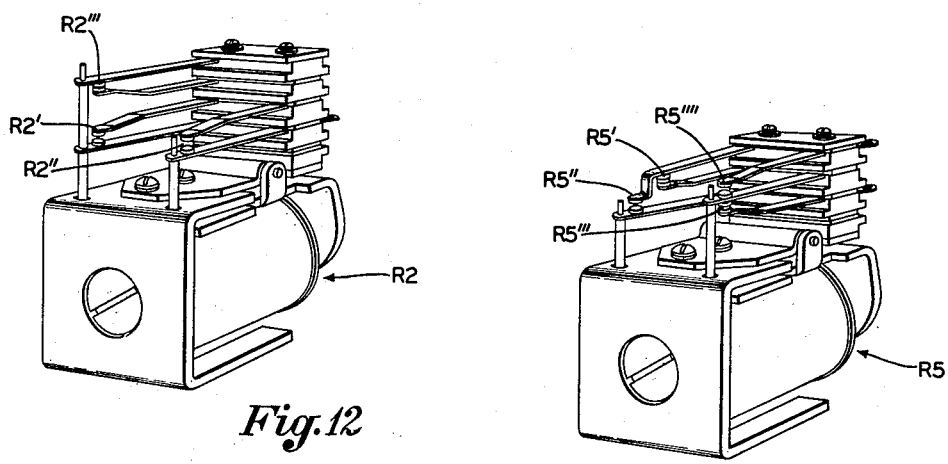
*Fig.12*
*Fig.13*
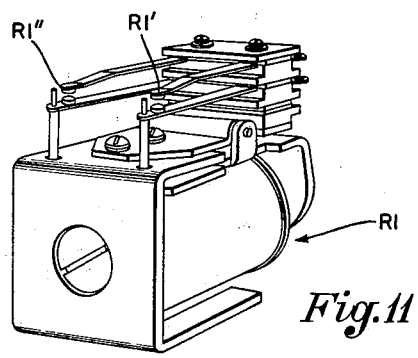
*Fig.11*
INVENTORS
Thomas H. Kenny
Herbert C. Obermiller and
BY  Robert P. Herlong
Fraase, Bishop, Johns & Schick
ATTORNEYS

# United States Patent Office 3,137,155
Patented June 16, 1964

3,137,155
DIGITAL READOUT COMBINATION LOCK CONSTRUCTION
Thomas H. Kenny, Navarre, and Herbert C. Obermiller, Canton, Ohio, and Robert P. Herlong, Bethesda, Md., assignors to Diebold, Incorporated, Canton, Ohio, a corporation of Ohio
Filed May 11, 1961, Ser. No. 109,445
16 Claims. (Cl. 70—330)

The invention relates to combination locks for vault doors and the like, and more particularly to a digital readout combination lock construction which absolutely prevents the observation of the numbers being dialed by anyone excepting the person manipulating the lock.

The conventional combination lock has a dial which indicates the position of the lock spindle when the operator of the lock turns the spindle to the combination positions to permit the opening of the lock.

These dials are normally exposed so that during the dialing operation, another person standing behind the operator may learn the combination of the lock by observing the lock combination numbers on the dial as the operator dials the combination.

It is known that attempts have been made to overcome this disadvantage by providing a housing around the dial, having an opening only at the top, through which the operator may observe the lock combinations on the dial as he dials the combination.

While such devices make it more difficult for an unauthorized person to observe the numbers on the dial as the same is operated, they do not entirely prevent the same.

It is, therefore, an object of the present invention to provide a device of the character referred to in which the dial is entirely covered by a housing and in which the numbers being dialed are visible only to the operator of the lock upon the screen of a digital display unit located within a downwardly inclined readout housing enclosed within the frame of the vault door or similar location.

Another object of the invention is to provide such a construction in which a commutator arm upon the dialing spindle rotates over a stationary electric contact plate device electrically connected through a suitable circuit with an electric digital display unit, visible only to the operator of the lock, which successively displays the lock combination numbers being dialed as the operator manipulates the spindle.

A further object of the invention is the provision of means operated by the electric circuit for lighting a red lamp or the like upon the retraction of the lock bolt after the operator has dialed the combination of the lock.

It is also an object of the invention to provide means incorporated with the electric contact plate device and the contact or commutator arm to cause the red lamp to continue burning until the tumblers of the lock have been scattered, even though the lock bolt is again extended, so that it can be determined at a glance if the lock is in condition to retract the bolt or that the bolt is retracted.

Another object of the invention is to provide means incorporated with the contact plate and contact arm or commutator for scattering the tumblers of the lock, whereby the red lamp will be shut off, indicating that the tumblers of the lock have been scattered.

It is still another object of the invention to provide a device of the character referred to which may be used for successively operating two combination locks operated by a dialing shaft or spindle subject to the push-pull method.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings.

The invention may be described in general terms as including a dialing spindle journalled through the frame of a vault door or the like and having a conventional dial rotatable therewith and completely covered by a housing, whereby the dial is completely hidden from view so that the combination numbers thereon may not be observed as the spindle is manipulated to dial the combination of the lock.

A commutator or contact arm is fixed upon the dialing spindle and rotatable therewith, and is provided with a plurality of brushes thereon which rotate over a plurality of stationary contact plates on a stationary contact plate device.

The electric contact plate device is located in an electric circuit in which is located a digital display unit. Such units comprise a small electronic device which, when the proper electric circuits are closed, flashes numbers on a screen. The parts are so coordinated that as the dialing spindle is rotated, the combination numbers upon the dial are flashed upon the screen of the digital display unit.

This digital display unit is located within a downwardly inclined readout housing, enclosed within the vault door frame, or similar location, and provided at its upper end with an opening at the eye level of the operator of the lock, so that the numbers flashed upon the screen of the digital display unit are visible only to him.

Means is provided in the electric circuit for lighting a red lamp upon the retraction of the lock bolt, after the operator has dialed the combination of the lock, so that the operator of the lock can determine at a glance if the bolt is or has been retracted.

Means is also provided for scattering the tumblers of the lock by rotation of the dialing spindle in one direction only, so as to shut off the red light when the tumblers have been scattered.

Having thus briefly described the nature of the operation, reference is now made to the embodiment of the same illustrated in the accompanying drawings, in which:

FIG. 1 is a front elevation of a vault door and door frame showing the invention applied thereto;

FIG. 3 is an elevation of the commutator arm on the dialing spindle;

FIG. 4 is an elevation of the commutator side of the stationary electric contact plate device;

FIG. 7 is a vertical section through the door frame showing the readout housing with the electric digital display unit therein;

FIG. 8 is a front elevation of the readout housing;

FIG. 9 is a perspective view of the digital display unit;

FIG. 11 is a perspective view of one of the relays;

FIG. 12 is a perspective view of another type of relay used in the circuit; and

FIG. 13 is a perspective view of a third type of relay used.

Figure 2:
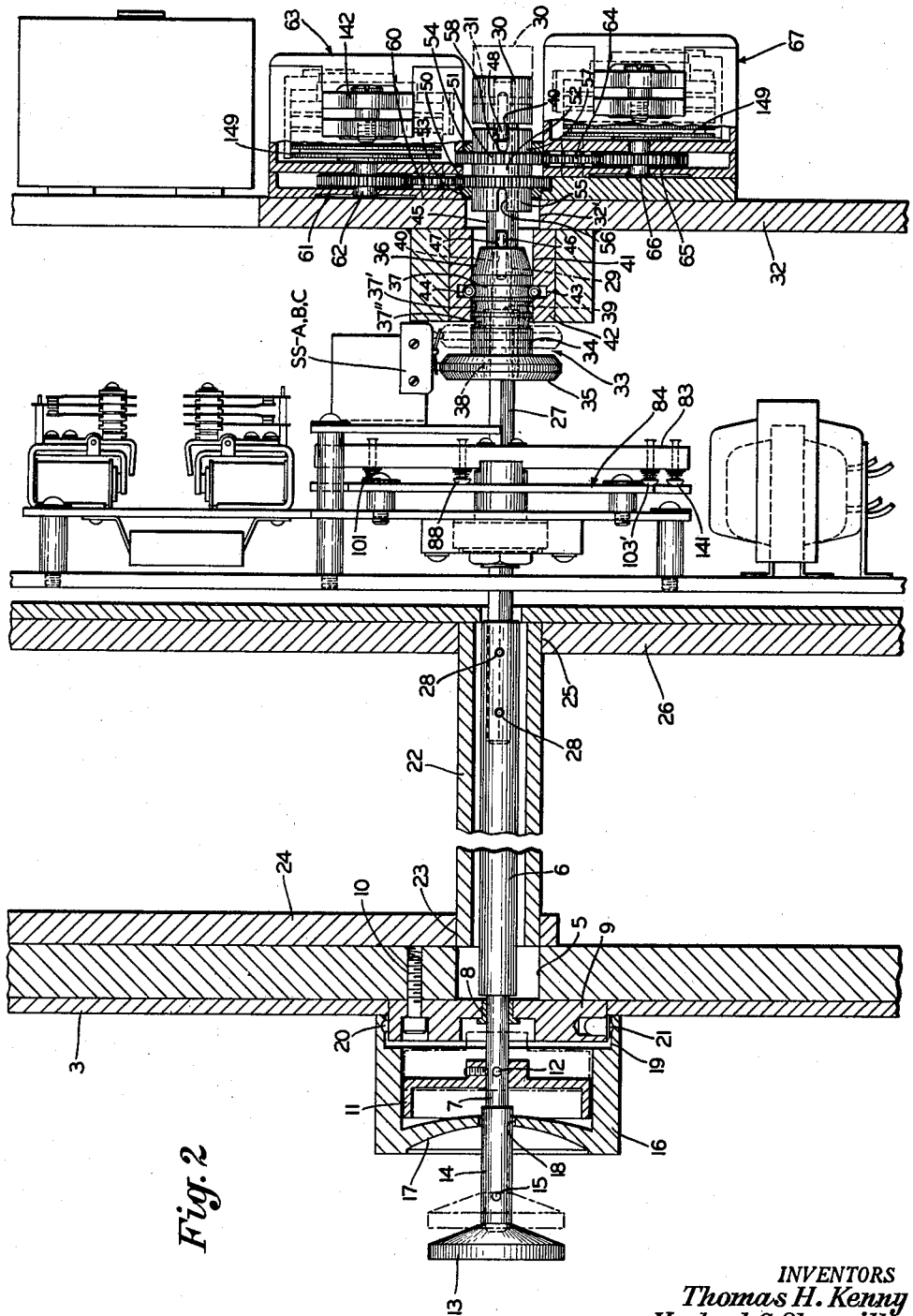
FIG. 2 is a horizontal sectional view, showing the dialing spindle with commutator arm thereon cooperating with the stationary contact plate device and the associated parts.

The invention is illustrated in the drawings as applied to a safe provided with two combination locks adapted to be successively operated by a single push-pull type of dialing spindle. A conventional safe door is shown at 1 hinged as at 2 within the door frame 3.

A conventional door pull handle 4 is attached to the swinging edge of the safe door 1 for opening the door when the combination locks have been operated to permit withdrawal of the lock bolts.

As best shown in FIG. 2, an opening 5 is formed in the door frame, of considerably larger diameter than the dialing spindle 6, the outer end of which is received within said opening. The reduced outer end portion 7 of the spindle is journalled through a bushing 8 in the bearing plate 9, which is attached to the outer surface of the door frame 3 as by bolts 10.

A conventional combination lock dial 11 is attached to the reduced portion 7 of the dialing spindle as by the pin 12. The usual knob 13, for manipulating the dialing spindle, is shown as provided with a sleeve 14 receiving the outer end of the reduced portion 7 of the spindle and pinned thereto as shown at 15.

For the purpose of hiding the dial 11 from view, so that the numbers thereon cannot be observed when the dialing spindle is rotated by means of the knob 13 to manipulate the combination locks, a housing 16 is provided. This housing is of hollow cylindrical shape with an outer end wall 17 provided with central aperture 18, through which the sleeve 14 of the dialing spindle knob may be rotatably and slidably manipulated.

The inner end of the cylindrical housing 16 is reduced in thickness, as at 19, and provided on its inner perimeter with an annular groove 20 to receive a spring-loaded ball or balls 21 of conventional design, mounted in the peripheral portion of the bearing plate 9, for detachably holding the dial housing 16 assembled thereon.

The dialing spindle 6 is enclosed within a tubular housing 22, the outer end of which is received within a suitable aperture 23 in the plate 24 on the inner side of the door frame 3, the inner end of the tubular housing being received in an aperture 25 in a plate 26.

The inner end of the spindle 6 is reduced in diameter and may comprise a separate square member 27 attached to the spindle 6 as by pins 28 and having the reduced end portion 29. A collar 30 is fixed to the terminal end thereof as by a pin 31.

The portion 29 of the spindle is located through an aperture 32' in the lock mounting plate 32. A detent assembly indicated generally at 33 is mounted upon the portion 27 of the spindle and comprises generally a cylindrical member, indicated generally at 34, with cam 35 at its outer end and preferably tapered at its inner end as at 36.

Three rounded circumferential grooves are formed in the periphery of the cylindrical portion 34 and are indicated at 37, 37' and 37''. A central bore is formed through the member 33, the outer end 38 thereof being of greater diameter than the portion 27 of the spindle. The bore is shouldered as at 39 and the inner, reduced end 40 thereof is square in cross section and fits upon the square portion 29 of the spindle.

The member 34 is slidable longitudinally within the cylindrical bore 41 in the guide member 42. An annular groove 43 is formed in the inner perimeter of the guide member 42 and the resilient ring 44 is located therein and adapted to selectively engage the circumferential grooves 37, 37' and 37'' in the member 34 for holding the spindle in longitudinally adjusted positions.

A tubular spacer sleeve 45 surrounds the reduced portion 29 of the spindle between the detent assembly 33 and the collar 30. A longitudinally disposed pin 46 is eccentrically mounted in the inner end of the detent member 34 and a portion thereof is received in the longitudinal slot 47 in the spacer sleeve 45.

A similar pin 48 is located in the opposed face of the collar 30, a portion thereof being received in the longitudinal slot 49 in the spacer sleeve.

A spaced pair of gear wheels 50 and 51, with a spacer 52 therebetween, are rotatably and slidably mounted upon the spacer sleeve 45. Longitudinal movement of the gears 50 and 51 is prevented by the stationary bearing plates 53 and 54 located on opposite sides of the gear wheels 50 and 51 respectively.

A skirt 55 is provided upon the side of the gear wheel 50 toward the detent member 34 and provided with a longitudinal slot 56 adapted to receive the pin 46 on the detent member 34, when the spindle is pushed inwardly to the position where the circumferential groove 37'' in the member 34 receives the resilient ring 44.

A similar skirt 57 is provided upon the side of the gear wheel 51 toward the collar 30, and the longitudinal slot 58 therein is adapted to receive the pin 48 upon the collar when the spindle is pulled outward to the position where the resilient ring 44 is received in the circumferential groove 37.

The gear wheel 50 meshes with an idler pinion 60, which in turn meshes with a gear wheel 61 upon the spindle 62 of a combination lock of any usual and well known construction indicated generally at 63.

The gear wheel 51 meshes with an idler pinion 64, which in turn meshes with a gear wheel 65 upon the spindle 66 of a second combination lock of usual and well known construction, indicated generally at 67.

With this arrangement, it will be obvious that when the operator grasps the knob 13 and pushes the dialing spindle inward to the position where the resilient ring 44 is received in the circumferential groove 37'' of the detent member 34, the pin 46 upon said detent member will be received in the slot 56 in the skirt of the gear wheel 50, thus locking the gear wheel 50 to the spindle.

At the same time, the collar 30 upon the end of the dialing spindle, will be moved to the broken line position shown in FIG. 2, holding the pin 48 thereof out of engagement with the slot 58 in the skirt of the gear wheel 51, so that the same is loose upon the spindle.

With the parts in this position, rotation of the spindle in either direction will rotate the usual tumblers in the combination lock 63 through the gear wheel 50, idler pinion 60 and gear wheel 61.

After the combination lock 63 has been operated, the dialing spindle, by means of the knob 13, may be pulled out to the full line position shown in FIG. 2, so that the circumferential groove 37 in the detent member 34 receives the resilient ring 44.

At the same time the collar 30 upon the inner end of the spindle will be moved to the full line position shown in FIG. 2, the pin 48 therein being received in the slot 58 in the sleeve of the gear wheel 51 locking the gear wheel 51 to the spindle.

As the dialing spindle is then rotated, the tumblers in the combination lock 67 will be rotated through the gear wheel 51, idler 64 and gear wheel 65. When the combination of the lock 67 has been dialed, the bolt may be withdrawn in usual manner, permitting the door 1 of the vault to be swung open upon its hinges 2 by means of the door pull handle 4 in usual and well known manner.

A plurality of switches are located in position to be operated by the cam 35 of the detent member, when the dialing spindle is pushed in or pulled out to operatively connect it to either of the combination locks. These switches are referred to herein as shaft switches.

Three of these switches are provided, each being adapted to be operated by the cam 35 to make one connection when the dialing spindle is pushed in to operate the lock 63 and to make another connection when the spindle is pulled out to operate the lock 67.

When the spindle is moved to the intermediate or neutral position, so that the spring ring 44 is received in the intermediate groove 37' on the detent member 33, these switches will all be in open position.

Only one of these shaft switches is shown in FIG. 2, and it may be any one of the three shaft switches indicated in the wiring diagram as SS–A, SS–B and SS–C, as will be later described in detail.

For the purpose of providing means to permit only the operator of the lock to see the combination numbers as he is dialing the combination of each lock, an electric digital display unit of well known construction is provided, as indicated generally at 68, and adapted to be operated by means controlled by rotation of the dialing spindle, to display the combination numbers as they are dialed.

A typical digital display unit is illustrated in FIG. 9, and comprises a case 69, which may be formed of aluminum or other suitable material, provided at its upper end with a viewing screen 70 of suitable transparent material.

A plurality of lamps 71, equal in number to the number of digits to be displayed by the unit, are mounted in the rear end of the case 69. The terminals 72 of the lamps are adapted to be connected by wires 73 to an electric circuit shown in FIG. 6, to be later described.

A plate 74 is located in front of the lamps, and has lenses 75 therein corresponding in position and number to the lamps. These lenses may be formed of heat absorbing glass to remove infra-red rays.

A condensing lens 76 is located in front of the plate 74, and directly in front of the condensing lens is located a stray light trap of black oxidized-formed beryllium copper having thereon the digits to be displayed corresponding in number and position to the lenses 75 and lamps 71.

A projection lens 77 is located in front thereof and between the projection lens and viewing screen is located a stray light trap of black oxidized beryllium copper 78, having apertures 79 therein corresponding in position and number to the digits to be displayed. As each lamp is lighted the corresponding digit is displayed upon the viewing screen 70, as indicated at 80.

As shown in FIG. 9, the digital display unit used is a double unit, one side thereof displaying the tens and the other side displaying the units of the numbers being dialed as the dialing spindle is rotated.

As shown in FIG. 8, the digital display unit 68 is located within the door frame 3 in upright position with the viewing screen 70 thereof located at the lower end of the downwardly and inwardly inclined read-out housing 81, located through the door frame 3 and having the opening 82 at its outer end located at eye level, so that the operator of the lock may observe the digits upon the viewing screen 70 as he dials the combination of each lock.

For the purpose of operating the electric digital display unit 68, by the rotation of the spindle, a commutator or contact arm 83 is arranged to be rotated by the dialing spindle and provided with brushes which rotate upon a stationary electric contact plate device, indicated generally at 84. This electric contact plate device is shown in detail in FIGS. 4 and 5.

Referring first to FIG. 4, which shows the commutator side of the electric contact plate device, this device is formed of suitable insulation material, as indicated at 85, and has a central opening 86, through which the dialing spindle is rotatably and slidably located.

The centrally located circular contact plate 87 is continuously contacted by the brush 88 upon the commutator arm 83 and provides the common ground connection which completes all electrical circuits through the commutator arm.

Surrounding and insulated from the circular contact plate 87, a plurality of similar sectors of unit contact plates are located upon the commutator side of the electric contact plate device 84, each sector comprising 10 units contact plates, indicated at 91, 92, 93, etc. to 100, insulated from each other and corresponding with the digits 1 to 9 and 0 in the units side of the digital display unit.

These units contact plates are adapted to be successively contacted by the brush 101 upon the commutator arm as it rotates over the surface of the stationary electric contact plate device 84.

Surrounding and insulated from the sectors of units contact plates 91 to 100, is a circular series of tens contact plates, indicated at 102, there being a tens contact plate corresponding to each sector of units contact plates.

There are ten of the tens contact plates 102, corresponding in position to the ten sectors of units contact plates. Each tens contact plate 102 has a terminal 103 connected thereto and disposed on the terminal side of the plate as shown in FIG. 5, for the connection of wires leading through the electric circuit, to be later explained, for connection to the tens side of the digital display unit shown in FIG. 9, for the purpose of successively displaying the numerals 0 to 9 on the viewing screen of the tens side of the digital display unit as the brush 103' on the commutator arm 83 successively contacts the tens contact plates 102.

Figure 5:
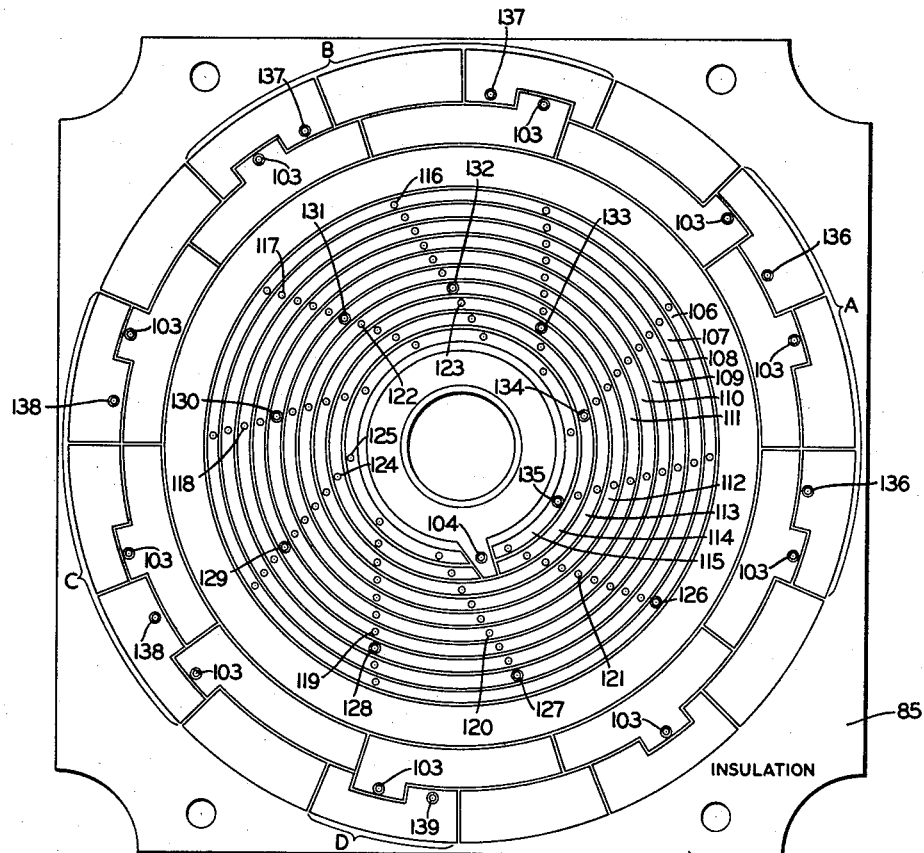
FIG. 5 is an elevation of the terminal side of the stationary electric contact plate device.

Referring now to the terminal side of the stationary electric contact plate shown in FIG. 5, a terminal 104 is located through the plate and connected to the common ground connection ring 87. For this purpose the ring 87 may have a lug extending outwardly from its periphery as shown at 105, to which the terminal 104 is connected.

A concentric series of rings 106, 107, 108, etc. to 115, is located upon the terminal side of the plate. One units contact plate of each sector is connected to one of the rings, the next units contact plate of each sector is connected to the next ring, and so on, succeeding units contact plates of the several sectors being connected to successive rings. As shown in the drawings, each of the units contact plates 91 of the several sectors is connected to the outermost ring 106, as indicated at 116.

The next succeeding units contact plates 92 of the several sectors are all connected to the next inner ring 107 as shown at 117, and each units contact plate 93 of the several sectors is connected to the next inner ring 108 as indicated at 118.

The next succeeding units contact plates 94 of the several sectors are connected to the next inner ring 109, as indicated at 119, and the next succeeding units contact plates 95 of the several sectors are connected to the next inner ring 110, as indicated at 120.

The units contact plates 96 of the several sectors are connected to the next inner ring 111, as indicated at 121, and the next succeeding units contact plates 97 of the several sectors are connected to the next innermost ring 112, as indicated at 122.

In like manner, the next succeeding units contact plates 98 of the several sectors are connected to the next inner ring 113, as indicated at 123, and the next succeeding units contact plates 99 of the several sectors are connected to the next inner ring 114, as indicated at 124, and finally the endmost units contact plates 100 of the several sectors are connected to the innermost ring 115, as indicated at 125.

Referring again to the terminal side of the stationary contact plate as shown in FIG. 5, the rings 106 to 115 are provided with terminals indicated at 126 to 135 respectively. These terminals are connected through the circuit to the units side of the digital display unit, so that as the brush 101 upon the commutator arm 83 contacts the units contact plates 91 to 100 in each unit sector on the commutator side of the stationary contact plate device 84, as shown in FIG. 4, the numerals 0 to 9 will be successively displayed upon the viewing screen on the units side of the digital display unit.

Referring again to the commutator side of the contact plate device shown in FIG. 4, a circular series of scatter indication contact plates surrounds the tens contact plate 102. These scatter contact plates are located in groups, spaced and insulated from each other. For the particular embodiment of the invention disclosed herein, this grouping is indicated generally at A, B, C and D.

The group A comprises the contact plates A–30 and A–31, spaced and insulated from each other and provided with terminals 136 extending through the terminal side of the plate for connection in the circuit as will be later described.

The group B comprises the contact plates B–32 and B–33, spaced and insulated from each other and having the terminals 137 extending through the terminal side of the contact plate device, as shown in FIG. 5, for connection to the circuit.

The group C comprises the contact plates C–34 and C–35, spaced from and insulated from each other and having the terminals 138 located through the terminal side of the contact plate device for connection in the circuit.

The group D comprises the single contact plate D–36 having a terminal 139 located through the terminal side, as shown in FIG. 5, for connection in the circuit.

Located between the several groups A, B, C and D of the scatter contact plates, and between the spaced contact plates of the several groups, are plates indicated at 140 which have no terminals and are not connected in the circuit, but are provided merely for the brush 141 upon the commutator arm 83 to slide upon as it moves from one scatter contact plate to another.

Each of the combination locks 63 and 67 is of the same construction and may be of conventional combination lock design. A plurality of conventional tumblers 149 is mounted upon the spindle 62 or 66 of the lock. For the purpose of the present embodiments it may be assumed that there are three tumblers in each lock.

As in usual and well known combination lock construction, the lock bolt 142 is adapted to be retracted by rotation of the spindle after the combination has been dialed and the fence 143 has dropped into the gates 144 of the tumblers.

Figure 10:
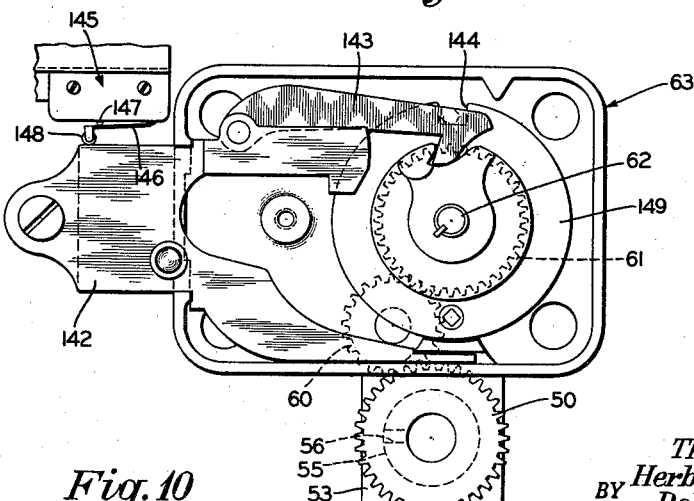
FIG. 10 is a sectional elevation of one of the combination locks and the micro switch operated by the lock bolt.

As shown in FIG. 10, a micro switch indicated generally at 145, is located adjacent to each combination lock and adapted to be operated by the lock bolt 142 thereof. This micro switch is of a conventional type adapted to be operated by movement of the pivoted arm 146 toward the housing of the switch to depress a plunger 147 which operates the switch in conventional manner.

A roller 148 upon the free end of the lever arm 146 is adapted to be contacted by the lock bolt 142 when the same is in locked position, so as to press the free end of the lever toward the housing of the micro switch and hold the switch in closed position.

Figure 6:
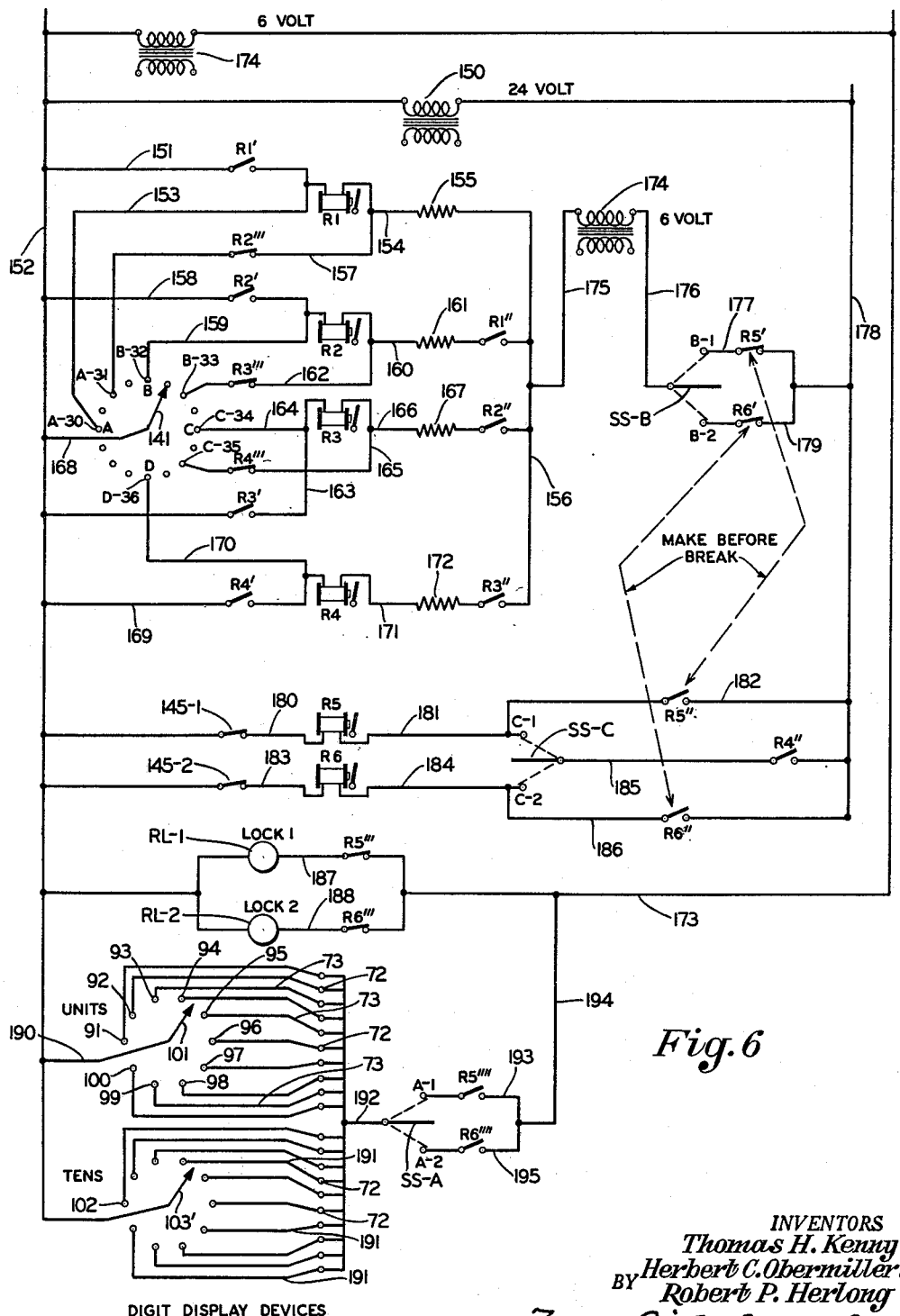
FIG. 6 is a wiring diagram of the electric circuit.

In FIG. 6 is shown a typical wiring diagram for the device. The arrangement shown is for use with two combination locks, to provide for four revolutions of the dialing spindle for scattering the tumblers of each lock, and is powered from 6-volt, 24-volt and 30-volt sources.

It will be understood that other voltages may be used, and that the circuit may be arranged for use with any other plurality of locks or with only a single lock, and that it may be arranged for more or less revolutions of the setting shaft to scatter the tumblers, depending upon the number of tumblers in each lock.

A 24-volt source, which may be a transformer or other power source, is indicated at 150, and a series of relays indicated at R1, R2, R3, R4, R5 and R6 are located in the circuit connected thereto.

In FIG. 11 is shown a perspective view of the relay R1, provided with two normally open contacts indicated at R1′ and R1″ arranged to be closed when the relay is energized.

In FIG. 6, one end of the coil of relay R1 is shown connected by wire 151 to the wire 152 leading from one side of the transformer 150. A wire 153 connects the same end of the coil of relay R1 with contact plate A–30 on the stationary contact plate device shown in FIGS. 4 and 5.

A wire 154, with 25 ohm resistor 155 therein, connects the other end of the coil of relay R1 with a wire 156 which is connected to the coils of relays R2, R3 and R4, as will be later described.

This end of the coil of relay R1 is also connected by wire 157 with the contact plate A–31 of the scattering contacts on the stationary contact plate device 84.

One end of the coil of relay R2 is connected by wire 158 with wire 152, and a wire 159 connects the same end of this relay coil with scatter contact plate B–32. The other end of the coil of relay R2 is connected to the wire 156 by wire 160, with 25 ohm resistor 161 therein, and is connected by wire 162 to the scatter contact plate B–33.

Relay R2, as shown in FIG. 12, has two normally open contacts R2′ and R2″, and a normally closed contact R2‴. Relays R3 and R4 are of the same construction as relay R2. Relay R3 has two normally open contacts R3′ and R3″, and a normally closed contact R3‴. One end of the coil of relay R3 is connected by wire 163 with wire 152 and is also connected by wire 164 to the scatter contact C–34.

The other end of the coil of relay R3 is connected by wire 165 with scatter contact C–35, and is connected by wire 166, with 25 ohm resistor 167 therein, to a wire 156. Brush 141 on the commutator arm 83 is connected by wire 168 to wire 152. Relay R4 has two normally open contacts R4′ and R4″ and a normally closed contact R4‴.

One end of the coil of relay R4 is connected by wire 169 with wire 152 and by wire 170 with scatter contact plate D–36, and the other end of the coil is connected by wire 171, 25 ohm resistor 172 therein, to wire 156.

For the purpose of indicating when the lock bolts have been withdrawn after the combinations of the locks have been dialed, an indicator light is provided for each lock and adapted to be lighted to indicate when the locks are open.

Red lamps are preferably provided for this purpose and are indicated at RL–1 and RL–2 in FIGS. 1 and 6. The lamp RL–1 may be arranged to be lighted when the lock 63 is open and the red lamp RL–2 to be lighted when the lock 67 is open.

These indicator lights are shown in the wiring diagram, FIG. 6, as connected by wire 173 with a transformer, or other 6-volt source 174, provided only for the lights in the device. The lighting of these indicator lamps is controlled by the lock switches 145 shown in FIG. 10 and indicated in the wiring diagram, FIG. 6, at 145–1 and 145–2, and by the relays R5 and R6.

Both of these relays are of the same construction, and for purpose of illustration only the relay R5 is shown in FIG. 13. This relay has a special set of make-before-break contacts indicated at R5′ and R5″ and a set of standard break-before-make contacts indicated at R5‴ and R5⁗.

The relay R6 is of the same construction as the relay R5 and has a special set of make-before-break contacts, indicated in FIG. 6 at R6′ and R6″, and a set of standard break-before-make contacts R6‴ and R6⁗.

An additional 6-volt source 174 is added to the circuit from the 24-volt source 150. Wire 175 connects transformer 174 with wire 156 and wire 176 connects transformer 174 with shaft switch SS–B.

When the dialing spindle is pushed in to operate lock 63, the shaft switch SS–B makes contact at B–1 and when the dialing spindle is pulled out to operate lock 67, shaft switch SS–B makes contact at B–2.

The normally closed contact R5′ of the make-before-break contact of relay R5 is located in wire 177, connecting stationary contact point B–1 with the common wire 178, and in like manner the normally closed contact R6′ of the make-before-make contact of relay R6 is located in wire 179, connecting the stationary contact point B–2 with the common wire 178.

The coils of relays R5 and R6 are normally de-energized. One end of the coil of relay R5 is connected by wire 180, through lock switch 145–1, to the wire 152, and the other end of this coil is connected by wire 181 with stationary contact point C–1 of shaft switch SS–C.

Wire 182, in which the normally open contact R5″ of the make-before-break contact of relay R5 is located, connects the stationary contact point C–1 with the common wire 178. In like manner, lock switch 145–2 is located in wire 183 which connects one end of the coil of relay R6 with the wire 152, the other end of the coil being connected by wire 184 with the stationary contact point C–2 of the shaft switch SS–C.

The shaft switch SS–C is connected by wire 185 with the common wire 178, and the stationary contact point C–2 is connected by wire 186 with the common wire 178, the contact R6″ of the make-before-break contact of relay R6 being located in the wire 186.

Indicator light RL–1 is connected by wire 187 to wires 152 and 173, the normally closed contact R5‴ of relay R5 being located in wire 187 between the lamp RL–1 and the wire 173. In like manner, indicator lamp RL–2 is connected by wire 188 with wire 152 and wire 173, the normally closed contact R6‴ of relay R6 being located in wire 188 between the lamp and the wire 173.

In FIG. 6, the terminals of the several sectors of units contact plates 91 to 100 are shown as connected by wires 73 to the terminals 72 of the lamps in the units side of the digital display device. The brush 101 of the commutator arm, which contacts the digits contact plates, is connected as at 190 to the circuit wire 152.

The terminals of the tens contact plates 102, on the stationary contact plate device, are shown in FIG. 6 as connected by the wires 191 to the lamp terminals 72 in the tens side of the digital display device.

The lamp terminals 72 of both sides of the digital display device are connected by the common wire 192 to the shaft switch SS–A. The contact point A–1 of the shaft switch SS–A is connected by wire 193 to the 6-volt circuit wire 173 through the wire 194. In like manner, the stationary contact A–2 of the shaft switch SS–A is connected by wire 195 to the 6-volt light circuit.

In the operation of the digital read-out lock construction above described, when the operator stands in position to manipulate the knob 13 to dial the combinations of the locks, the open outer end 82 of the read-out housing 81 is substantially at eye level, so that as he dials the combination of each lock, he will keep his eyes at the opening 82 so as to observe the dial numbers displayed on the viewing screen of the digital display device. These dial numbers are not visible to any other person excepting the operator.

The operator will first push the dialing spindle in, to operatively connect the same with the combination lock 63, or pull the dialing spindle out, to operatively connect the setting shaft with the combination lock 67, depending upon which of the two locks he may operate first.

It will be seen that when the dialing spindle is pushed in to make operative connection with the combination lock 63, the shaft switches SS–A, SS–B and SS–C will be operated to make contact at A–1, B–1 and C–1 respectively.

When the dialing spindle is operatively connected to either of the combination locks, the combination of the lock may be dialed by alternately rotating the spindle in opposite directions to dial the combination of the lock.

As the knob is rotated, the commutator arm 83 will be rotated in the same direction, the brushes thereon contacting with the various contact plates upon the commutator side of the stationary electric contact plate device shown in FIG. 4.

The brush 101 upon the commutator arm will successively contact the units contact plates 91 to 100 in each sector, while the brush 103′ will be in contact with one of the tens contact plates 102.

It will be seen that there are ten sectors of units contact plates 91 to 100, with one tens contact plate 102 for each sector. Each of the units contact plates 91 to 100 of each sector is successively electrically connected, through the circuit, to the terminal of the corresponding lamp in the units side of the digital display device, as the brush 101 of the commutator arm contacts each of said units contact plates.

Thus the numerals 0 to 9 are successively displayed upon the screen on the units side of the digital display device as the brush 101 passes successively over the units contact plates of each sector.

Each of the tens contact plates 102 is connected to the terminal of one of the lamps in the tens side of the digital display device. Thus, as the brush 103′ of the commutator arm contacts the tens contact plate 102 of the first sector, the lamp in the tens side of the digital display device will flash the numeral 0 on the screen on the tens side, and as the brush 103′ contacts the tens contact plate 102 of the next sector, the numeral 1 will be flashed upon the screen on the tens side, and so on.

With this arrangement all of the dial numbers from 1 to 100 may be displayed upon the screen of the digital display device as these numbers are dialed. As there is no hundreds column for the digital display device, the numerals "00" on the screen of the digital display device will represent the number 100 on the dial.

After the operator has dialed the combination of the first combination lock and has rotated the spindle in direction to retract the lock bolt 142 of the lock, the lock switch 145–1 will be operated by retraction of the lock bolt and the signal lamp RL–1 will be lighted indicating that the first lock is unlocked.

The signal lamp RL–1 will remain lighted until the tumblers of the combination lock 63 have been scrambled, even though the lock bolt is again extended. Therefore, one who is in charge of the lock can determine at a glance if the combination of the lock has been dialed and the bolt is or has been retracted. The means for shutting off the signal light when the tumblers of the lock are scattered will be later explained.

Assuming that the lock 63 has first been operated, the operator will then pull the dialing spindle out to operatively connect it with the combination lock 67. When the dialing spindle is operatively connected with the combination lock 67, the combination of this lock may be dialed by alternately rotating the dialing spindle in opposite directions to dial the combination of the lock.

After the operator has dialed the combination of the lock 67 and has rotated the spindle in direction to retract the lock bolt thereof, the lock switch 145–2 will be operated by retraction of the lock bolt, and the signal lamp RL2 will be lighted, indicating that the second lock is unlocked. The signal lamp RL2 will remain lighted until the tumblers in the lock 67 have been scattered.

To scatter the tumblers of a lock, it is usually necessary to rotate the spindle of the lock one complete revolution for each tumbler. Ordinarily this rotation may be either in a clockwise or counter-clockwise direction.

However, in the present apparatus, in order to shut off the signal lamps RL1 and RL2, for indicating that the tumblers of the locks are scattered, the spindle must be rotated in only one direction.

With the dialing spindle operatively connected to either lock, the spindle is rotated in a direction so that the brush 141 on the commutator arm will rotate counter-clockwise over the contact plate device 84, so as to contact the scatter contact plates A–30, A–31, B–32, B–33, C–34, C–35 and D–36 in the proper order to scatter the tumblers.

Referring to FIG. 6, it will be seen that each group of contact plates indicated at A, B, C and D is connected to one of relays R1, R2, R3 and R4. As shown in FIG. 6, the scatter contact plates A–30 and A–31 of the group A are connected to the relay R1; the scatter contact plates B-32 and B-33 of group B are connected to the relay R2; the scatter contact plates C-34 and C-35 of group C are connected to the relay R3, and the scatter contact plate D-36 is connected to the relay R4. This relay system counts the number of revolutions, minus a few degrees, which the spindle has been rotated.

For the present purpose it may be assumed that each of the combination locks 63 and 67 has three tumblers. It would, therefore, take approximately three revolutions of the spindle of each lock to scatter the tumblers therein.

Four relays are used in this counting system, because two relays are used for the first tumbler and one relay for each tumbler in the lock thereafter. The relay system is so arranged that the commutator arm must be rotated in a counterclockwise direction over the contact plate device 84.

As the brush 141 on the commutator arm contacts the scatter contact plate A-30, the first relay R1 is actuated. The commutator arm is then rotated approximately 360° in counter-clockwise direction and as it passes over the scatter contact plate B-32 the second relay R2 is actuated.

If the commtator arm is rotated in clockwise direction, after the relay R1 is actuated, so that the brush 141 passes over the contact plate A-31 before it passes over contact plate B-22, the coil of relay R1 will be shorted out thus de-energizing relay R1, and the entire operation must be started over.

It will be seen, however, that after the brush 141 of the commutator arm passes over the contact plate B-32, the first relay R1 will be locked, and any subsequent passing of the brush over the plate A-31 will have no effect.

After passing over the contact plates A-30 and B-32, to actuate the relays R1 and R2 respectively, the rotation of the commutator arm in counter-clockwise direction is continued, and as the brush 141 passes over the contact plate C-34 the relay R3 is actuated. As the rotation of the commutator arm in counter-clockwise direction is continued, the brush 141 thereof will then pass over the contact plate D-36 to actuate the relay R4.

After the brush 141 has passed successively over the contact plates A-30, B-32, C-34 and D-36, the complete relay system will be actuated, and the indicator light RL1 or RL2, depending upon which of the two combination locks is operatively connected to the dialing spindle, will go off indicating that the tumblers of this lock have been scattered.

The dialing spindle is then operatively engaged with the other combination lock and the above-described process repeated to shut off the indicator light for that lock.

Although the invention is disclosed herein as applied to two combination locks operated by the push-pull method, it will be understood that it is equally applicable to a single combination lock.

It should also be understood that although the relay system illustrated is designed for four revolutions of the dialing spindle in order to scatter the tumblers, that the invention is equally applicable to combination locks having a greater or lesser number of tumblers, by providing a correspondingly greater or lesser number of relays.

From the above it will be obvious that the digital read-out combination lock construction disclosed provides means whereby the dial numbers are visible only to the operator of the lock.

It will also be obvious that the invention provides means for lighting a signal lamp to indicate when the combination of the lock has been dialed and the lock bolt has been retracted, and that the signal lamp will remain lighted until the tumblers of the lock have all been scattered.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. Digital readout combination lock construction comprising a combination lock, a rotatable lock combination dialing spindle operatively connected to said combination lock, an electrical digital display unit, a readout housing through which said digital display unit is visible, an electric circuit in which the digital display unit is located, and means upon said dialing spindle controlling said electric circuit for displaying the dialed numbers on said digital display unit as the dialing spindle is rotated to manipulate the combination lock.

2. Digital readout combination lock construction comprising a combination lock, a rotatable lock combination dialing spindle operatively connected to said combination lock, a readout housing open at one end, an electrical digital display unit located at the other end of said readout housing, an electric circuit in which digital display unit is located, and means upon said dialing spindle controlling said electric circuit for displaying the dialed numbers on said digital display unit as the dialing spindle is rotated to manipulate the combination lock.

3. Digital readout combination lock construction comprising a combination lock, a rotatable lock combination dialing spindle operatively connected to said combination lock, an electrical digital display unit, a readout housing through which said digital display unit is visible, an electric circuit in which the digital display unit is located, a stationary contact plate device located in said electric circuit, and a commutator arm mounted upon said dialing spindle and having brushes cooperating with said contact plate device for controlling said electric circuit for displaying the dialed numbers on said digital display unit as the dialing spindle is rotated to manipulate the combination lock.

4. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a readout housing located in the mounting member and open at its forward end through the mounting member front face, an electrical digital display unit having a viewing screen located at the rear open end of the readout housing, an electric circuit in which the digital display unit is located, and means upon said dialing spindle controlling said electric circuit for displaying the dialed numbers on said viewing screen as the dialing spindle is rotated to manipulate the combination lock.

5. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a downwardly and inwardly inclined readout housing located in the mounting member and open at its forward end through the mounting member front face, an electrical digital display unit having a viewing screen located at the rear open end of the readout housing, an electric circuit in which the digital display unit is located, and means upon said dialing spindle controlling said electric circuit for displaying the dialed numbers on said viewing screen as the dialing spindle is rotated to manipulate the combination lock.

6. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a readout housing located in the mounting member and open at its forward end through the mounting member front face, an electrical digital display unit having a viewing screen located at the rear open end of the readout housing, an electric circuit in which the digital display unit is located, and means upon said dialing spindle controlling said electric circuit for displaying the dialed numbers on said viewing screen as the dialing spindle is rotated to manipulate the combination lock.

7. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a readout housing located in the mounting member and open at the forward end through the mounting member front face, an upright electrical digital display unit having a viewing screen at its upper end located at the rear open end of the readout housing, an electric circuit in which the digital display unit is located, and means upon said dialing spindle controlling said electric circuit for displaying the dialed numbers on said viewing screen as the dialing spindle is rotated to manipulate the combination lock.

8. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a readout housing located in the mounting member and open at its forward end through the mounting member front face, an electrical digital display unit having a viewing screen located at the rear open end of the readout housing, an electric circuit in which the digital display unit is located, a stationary electric contact plate device located in said electric circuit, and a commutator arm mounted upon said dialing spindle and having brushes cooperating with said contact plate device for controlling said electric circuit for displaying the dialed numbers on said viewing screen as the dialing spindle is rotated to manipulate the combination lock.

9. Digital readout combination lock construction comprising a combination lock, a rotatable lock combination dialing spindle operatively connected to said combination lock, an electrical digital display unit, a readout housing through which the digital display unit is visible, an electric circuit in which the digital display unit is located, and means upon said dialing spindle controlling said electric circuit for displaying dialed numbers on said digital display unit as the dialing spindle is rotated to manipulate the combination lock.

10. Digital readout combination lock construction comprising a mounting member having a front face, a combination lock, a lock combination dialing spindle operatively connected to said combination lock and journalled in the mounting member, the front end of said spindle extending outwardly beyond the mounting member front face, there being a readout opening through the mounting member front face, an electrical digital display unit spaced behind the mounting member front face and having a viewing screen visible through said viewing opening, an electric circuit in which the digital display unit is located, and means upon said dialing spindle controlling said electric circuit for displaying dialed numbers on said viewing screen as the dialing spindle is rotated to manipulate the combination lock.

11. Digital readout combination lock construction comprising a mounting member having a front face, a combination lock, a lock combination dialing spindle operatively connected to said combination lock and journalled in the mounting member, the front end of said spindle extending outwardly beyond the mounting member front face, there being a readout opening through the mounting member front face, an electrical digital display unit spaced behind the mounting member front face and having a viewing screen visible through said viewing opening, an electric circuit in which the digital display unit is located, a stationary electric contact plate device located in said electric circuit, and a commutator arm mounted upon said dialing spindle and having brushes cooperating with said contact plate for controlling said electric circuit for displaying dialed numbers on said viewing screen as the dialing spindle is rotated to manipulate the combination lock.

12. Digital readout combination lock construction comprising a mounting member having a front face, a combination lock, a lock combination dialing spindle operatively connected to said combination lock and journalled in the mounting member, the front end of said spindle extending outwardly beyond the mounting member front face, there being a readout opening through the mounting member front face, an electrical digital display unit spaced behind the mounting member front face and having a viewing screen visible through said viewing opening, an electric circuit in which the digital display unit is located, a stationary electric contact plate device located in said electric circuit, a plurality of arcuate "tens" contacts on said contact plate device, a plurality of radially disposed "units" contacts associated with each "tens" contact, and a commutator arm mounted upon said dialing spindle and having a brush cooperating with said "tens" contacts and a brush cooperating with said "units" contacts for controlling said electric circuit for displaying dialed numbers on said viewing screen as the dialing spindle is rotated to manipulate the combination lock.

13. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a readout housing located in the mounting member and open at its forward end through the mounting member front face, an electrical digital display unit having a viewing screen located at the rear open end of the readout housing, an electric circuit in which the digital display unit is located, a stationary electric contact plate device located in said electric circuit, a plurality of arcuate "tens" contacts on said contact plate device, a plurality of radially disposed "units" contacts associated with each "tens" contact, and a commutator arm mounted upon said dialing spindle and having a brush cooperating with said "tens" contacts and a brush cooperating with said "units" contacts for controlling said electric circuit for displaying dialed numbers on said viewing screen as the dialing spindle is rotated to manipulate the combination lock.

14. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a downwardly and inwardly inclined readout housing located in the mounting member and open at its forward end through the mounting member front face, an electrical digital display unit having a viewing screen located at the rear open end of the readout housing, an electric circuit in which the digital display unit is located, a stationary electric contact plate device located in said electric circuit, a plurality of arcuate "tens" contacts on said contact plate device, a plurality of radially disposed "units" contacts associated with each "tens" contact, and a commutator arm mounted upon said dialing spindle and having a brush cooperating with said "tens" contacts and a brush cooperating with said "units" contacts for controlling said electric circuit for displaying dialed numbers on said viewing screen as the dialing spindle is rotated to manipulate the combination lock.

15. Digital readout combination lock construction comprising a mounting member having a front face, a combination lock, a lock combination dialing spindle operatively connected to said combination lock and journalled in the mounting member, the front end of said spindle extending outwardly beyond the mounting member front face, a readout housing located in the mounting member and open at the forward end through the mounting member front face, an upright electrical digital display unit having a viewing screen at its upper end located at the rear open end of the readout housing, an electric circuit in which the digital display unit is located, a stationary electric contact plate device located in said electric circuit, a plurality of arcuate "tens" contacts on said contact plate device, a plurality of radially disposed "units" contacts associated with each "tens" contact, and a commutator arm mounted upon said dialing spindle and having a brush cooperating with said "tens" contacts and a brush cooperating with said "units" contacts for controlling said electric circuit for displaying dialed numbers on said viewing screen as the dialing spindle is rotated to manipulate the combination lock.

16. Digital readout combination lock construction comprising a combination lock, a rotatable lock combination dialing spindle operatively connected to said combination lock, an electrical digital display unit having a viewing screen, a readout housing through which said viewing screen is visible, an electric circuit in which the digital display unit is located, a stationary electric contact plate device located in said electric circuit, a plurality of arcuate "tens" contacts on said contact plate device, a plurality of radially disposed "units" contacts associated with each "tens" contact, and a commutator arm mounted upon said dialing spindle and having a brush cooperating with said "tens" contacts and a brush cooperating with said "units" contacts for controlling said electric circuit for displaying dialed numbers on said viewing screen as the dialing spindle is rotated to manipulate the combination lock.

References Cited in the file of this patent

UNITED STATES PATENTS

| | | |
|---|---|---|
| 1,435,992 | Strauss et al. | Nov. 21, 1922 |
| 2,103,363 | Hansen | Dec. 28, 1937 |
| 2,215,162 | Scott | Sept. 17, 1940 |
| 2,924,742 | McNaney | Feb. 9, 1960 |